(12) United States Patent
Ignaczak et al.

(10) Patent No.: US 7,246,826 B2
(45) Date of Patent: Jul. 24, 2007

(54) PIPE LAP JOINT WITH IMPROVED SEALING SLOT FOR INCREASED CIRCUMFERENTIAL CLOSURE

(75) Inventors: Brian T Ignaczak, Rochester, MI (US); Alan M Polaski, Waterford, MI (US)

(73) Assignee: Breeze-Torce Products, LLC, Auburn Hills, MI (US)

( * ) Notice: Subject to any disclaimer, the term of this patent is extended or adjusted under 35 U.S.C. 154(b) by 0 days.

(21) Appl. No.: 11/243,234

(22) Filed: Oct. 4, 2005

(65) Prior Publication Data

US 2006/0071471 A1 Apr. 6, 2006

Related U.S. Application Data

(60) Provisional application No. 60/615,772, filed on Oct. 4, 2004.

(51) Int. Cl.
*F16L 13/14* (2006.01)

(52) U.S. Cl. .................. 285/382; 285/403; 285/420; 29/890.14

(58) Field of Classification Search ............... 285/382, 285/403, 400, 420, 374, 3; 29/890.14
See application file for complete search history.

(56) References Cited

U.S. PATENT DOCUMENTS

| | | | | |
|---|---|---|---|---|
| 4,113,289 A | * | 9/1978 | Wagner et al. ............ 285/322 |
| 4,629,226 A | * | 12/1986 | Cassel et al. ............... 285/382 |
| 5,588,680 A | * | 12/1996 | Cassel et al. .................. 285/3 |
| 5,944,365 A | * | 8/1999 | Kizler et al. ................ 285/420 |
| 6,089,624 A | * | 7/2000 | Cassel et al. ............... 285/382 |
| 6,199,921 B1 | * | 3/2001 | Cassel et al. ............... 285/424 |
| 6,435,565 B2 | * | 8/2002 | Potts et al. ............. 285/124.1 |
| 6,758,501 B2 | | 7/2004 | Amedure et al. | |
| 6,877,780 B2 | | 4/2005 | Potts et al. | |
| 7,025,393 B2 | | 4/2006 | Amedure et al. | |

* cited by examiner

*Primary Examiner*—David Bochna
(74) *Attorney, Agent, or Firm*—Reising, Ethington, Barnes, Kisselle, P.C.

(57) ABSTRACT

A pipe lap joint for use with vehicle exhaust systems which includes an inside pipe end telescopically inserted into an outside pipe end with the pipe ends secured together by a band clamp. The outside pipe end includes a sealing zone having a collapsible sealing slot that enables the outside pipe end to be drawn tight over the outside surface of the inside pipe end via the band clamp to thereby provide a fluid-tight seal between the pipes. The sealing slot extends from an open end of the outside pipe end and includes a pair of opposing sidewalls each having a tooth and recess. As the band clamp is tightened, the sealing slot collapses such that the teeth of the sidewalls move into the opposing, complementarily-shaped recesses, while adjoining circumferential edges of the teeth engage each other to thereby form a fluid seal.

19 Claims, 3 Drawing Sheets

PIPE LAP JOINT WITH IMPROVED SEALING SLOT FOR INCREASED CIRCUMFERENTIAL CLOSURE

CROSS-REFERENCE TO RELATED APPLICATION

This application claims the priority of U.S. Provisional Application No. 60/615,772, filed Oct. 4, 2004, the entire contents of which are hereby incorporated by reference.

FIELD OF THE INVENTION

This invention generally relates to pipe joints; more particularly, it relates to a telescoping pipe lap joint especially adapted for use in vehicle exhaust systems.

BACKGROUND OF THE INVENTION

In vehicle exhaust systems, it is desirable to provide a pipe joint with high pull-apart strength and with a good fluid seal between the pipes. It is becoming increasingly important to achieve greater reliability and uniformity in providing exhaust pipe joints with a good fluid seal.

In the Cassel U.S. Pat. No. 4,629,226, granted Dec. 16, 1986, a pipe lap joint is disclosed which provides a collapsible sealing zone in the outer pipe. This is achieved by providing a pair of intersecting end-to-end slots in the outer pipe which provide relief for circumferential contraction of the sealing zone within the overlap region of the pipe ends. A band clamp is disposed around the outside pipe and covers the inboard slot. When the band clamp is tightened around the outside pipe the sealing zone of the outer pipe is collapsed into close fitting engagement with the inner pipe. The intersecting outboard and inboard slots are circumferentially offset with the adjacent sidewalls in substantial alignment with each other and with the inner end wall of the outboard slot in substantial alignment with the outer end wall of the inboard slot. With this alignment and with the sidewalls and end walls of the slots being rectilinear, an inner corner of the outboard slot makes a point-to-point intersection with an outer corner of the inboard slot. With this structure, only a very small amount of collapse of the outer pipe is necessary to cause a sealing engagement between the inner end wall of the outboard slot and the outer end wall of the inboard slot.

The Cassel et al. U.S. Pat. No. 5,588,680, granted Dec. 31, 1996, discloses a pipe lap joint for vehicle exhaust systems in which a pair of non-intersecting end-to-end slots are provided to afford relief for circumferential contraction of the sealing zone within the overlap region of the pipe ends. With this construction, precise location of the adjacent corners of the slots is required and the sidewalls and end walls, which form the corners, are rectilinear. In this pipe joint, a fluid seal is obtained upon tightening of the band clamp on the outer pipe even though there is no substantial contraction of the sealing zone by collapse of the slots because a frangible bridging segment of the pipe wall extends between adjacent corners of the slots. Thus, the slots are isolated from each other when the frangible bridging element is either only slightly deformed or when it is completely fractured by collapse of the overlap region of the outer pipe.

U.S. Pat. No. 6,089,624 issued to Cassel et al. on Jul. 18, 2000 discloses a pipe lap joint in which an outer telescoping pipe end has a collapsible slot that includes a serpentine slot defined by a pair of inwardly protruding teeth. The telescoping end is overlapped onto a second, diametrically-smaller pipe end and a band clamp is placed about the telescoping end such that it overlaps at least a portion of the collapsible slot. The band clamp is then tightened which draws the protruding teeth together, thereby closing the slot. The disclosure of U.S. Pat. No. 6,089,624 is hereby incorporated by reference.

For pipes having reasonably good dimensional tolerances, a collapsible slot having a specific width can be designed in accordance with the diameters of the two pipe ends so that, during tightening of the band clamp, the slot collapses partially or completely but only enough to deform it slightly, if at all. However, the inventors have found that, where there is a greater degree of variability between pipe end diameters from one set of pipes to the next, the amount of circumferential closure of certain slots can be more limited than is desired due to the engagement of some slot features such as teeth with the opposite wall of the slot, and this can lead to situations in which the outer, telescoping pipe end does not sufficiently clamp down on and seal against the inner pipe end.

Thus, it is a general object of this invention is to provide a pipe lap joint with an improved sealing zone, particularly one that is well suited to accommodate variations in pipe end diameters.

SUMMARY OF THE INVENTION

According to one aspect of this invention, there is provided a pipe lap joint having an inside pipe with a pipe end, an outside pipe with a pipe end that has a sealing zone extending over at least a portion of the inside pipe end, and a band clamp. The sealing zone includes a collapsible sealing slot that has a first sidewall with a first tooth and recess, a second sidewall with a second tooth and recess, and an end wall. Tightening of the band clamp causes the sealing slot to collapse such that the first tooth is received by the second recess and the second tooth is received by the first recess.

According to another aspect of the invention, there is provided a method for telescopically coupling the ends of an inside and an outside pipe together. The method includes the steps of: (a) providing an inside pipe end; (b) providing an outside pipe end having a sealing zone with a collapsible sealing slot similar to that described above, (c) providing a band clamp having a clamping band and a tightening mechanism; (d) placing the band clamp around the outside pipe end and over the sealing zone; (e) inserting the inside pipe end within the outside pipe end; and (f) forcing the teeth of the sealing slot into their associated recesses by tightening the tightening mechanism so that the clamping band applies a radially inward force to at least a portion of said sealing zone.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
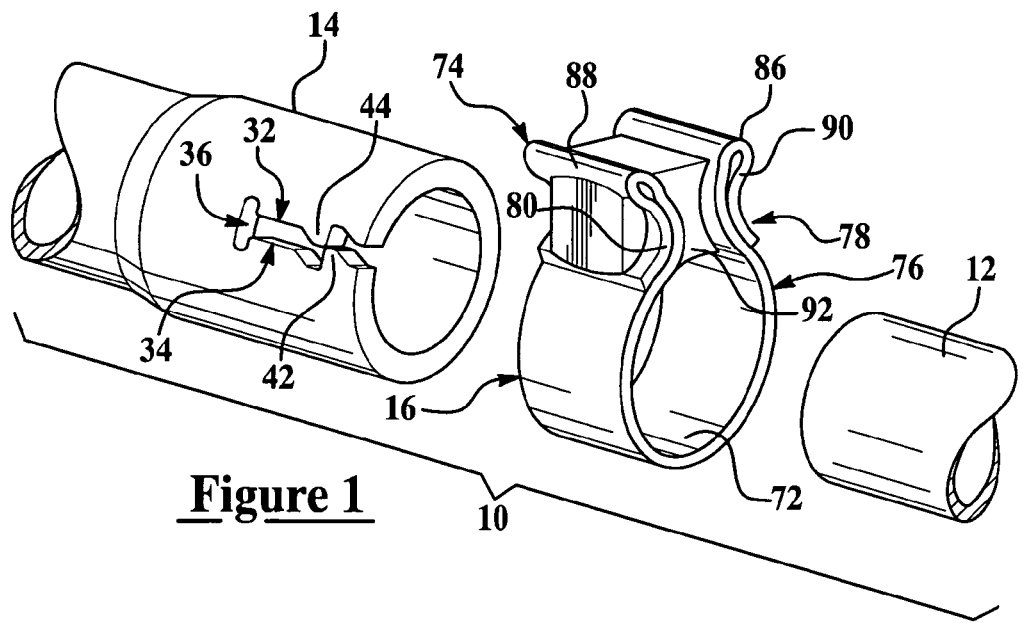
FIG. 1 is an exploded, perspective view of an embodiment of a pipe lap joint showing the parts of the joint before they are assembled.

With reference to the drawings, there are shown illustrative embodiments of a pipe lap joint which is especially adapted for use in a vehicle exhaust system. It will be appreciated as the description proceeds, however, that the pipe lap joint shown here is useful in other applications and is not limited to vehicle exhaust systems. The terms 'axially', 'angularly', 'circumferentially' and 'radially' refer to directions relative to the generally cylindrical shape of the illustrated pipes and pipe lap joint, so that the axial direction extends along the axis of this generally cylindrical shape, angularly refers to locations at points around the circumference of this generally cylindrical shape, the circumferential direction extends around the circumference of this generally cylindrical shape, and radial directions extend radially away from the axis.

As shown in the drawings, pipe lap joint 10 generally includes inside and outside pipes 12 and 14 telescopically coupled to one another, with a band clamp 16 for holding the pipe ends together and causing engagement thereof in a fluid sealing relationship. Outside pipe 14 preferably has a diametrically-enlarged pipe end which extends over an inside pipe end to provide an overlapping region of the pipes. Alternatively, it is possible to provide an outside pipe with a uniform diameter large enough to receive inside pipe 12, thereby obviating the need for the diametrically-enlarged pipe end. In order to provide a fluid seal between pipes 12 and 14, a radially collapsible sealing zone 22 is provided on the end of outside pipe 14 in the overlapping region.

Sealing zone 22 is located on the end of outside pipe 14 and is adapted to be contracted or collapsed in a radial direction by band clamp 16 so that the sealing zone is drawn into close fitting engagement with the exterior surface of the inside pipe end. In order to facilitate the collapse or contraction of sealing zone 22, it is provided with a winding, non-linear sealing slot 24. In the illustrative embodiment shown here, only a single sealing slot is used; however, in certain embodiments it may be desirable to use two or more sealing slots spaced circumferentially around the sealing zone of outside pipe 14.

Figure 2:
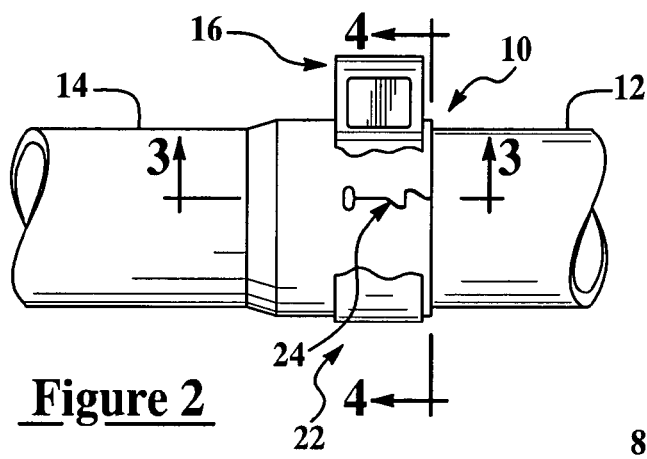
FIG. 2 is a side view of the pipe lap joint of FIG. 1 with the parts in assembled relation after a band clamp is tightened.
Figure 3:
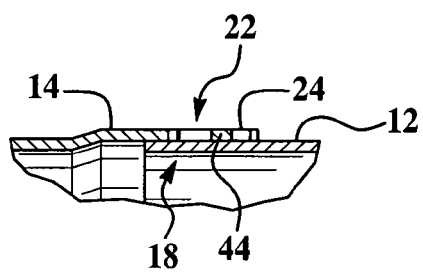
FIG. 3 is a view of the pipe lap joint of FIG. 2 taken on lines 3-3.
Figure 5:
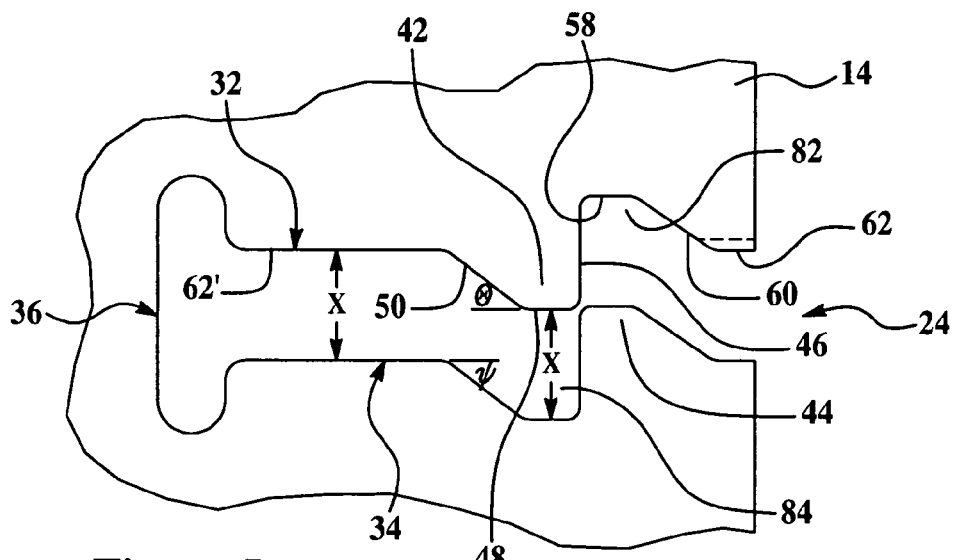
FIG. 5 is an enlarged view of the sealing slot of the pipe lap joint of FIG. 1 in a non-collapsed position.
Figure 6:
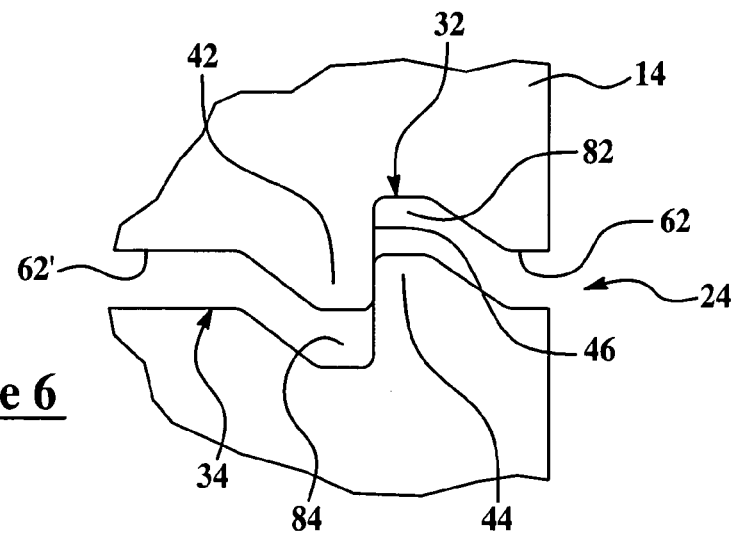
FIG. 6 is an enlarged view of the sealing slot of the pipe lap joint of FIG. 1 in a partially collapsed position.
Figure 7:
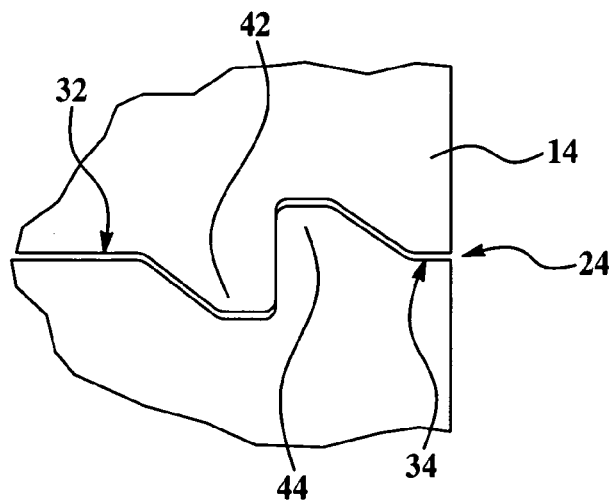
FIG. 7 is an enlarged view of the sealing slot of the pipe lap joint of FIG. 1 in a fully collapsed position.

Sealing slot 24 is designed to collapse under the radially-restrictive pressure of band clamp 16, and is shown in FIG. 1 before it is collapsed, in FIG. 2 after it is collapsed, and in various states in the drawings of FIGS. 5-7. Sealing slot 24 is open at one end of outside pipe 14 and generally extends inwardly towards a closed end of the slot, which is preferably disposed within sealing zone 22. The sealing slot 24 includes a pair of sidewalls 32, 34 and a generally oval or bulbous-shaped end wall 36, and defines a winding passage leading from end wall 36 to the open end of the slot. As will be appreciated, the sidewalls 32, 34 are generally parallel to one another and each includes a tooth 42, 44 and a recess or notch 82, 84, respectively. Each recess 82, 84 is shaped to receive an opposing, complementarily-shaped tooth 44, 42 when sealing slot 24 is collapsed by tightening of band clamp 16. For instance, recess 84 is located across the slot from tooth 42 and is designed to receive the opposing tooth during the collapsing of sealing slot 24. Similarly, recess 82 is positioned across the slot from tooth 44 and is sized and shaped to receive the tooth 44 when band clamp 16 is drawn tight. The inner corners of each of the recesses 82, 84 are radiused the same as the associated corners of teeth 42, 44 so that, in the event the slot is collapsed fully, there will not be any point penetration into an opposing sidewall by any sharp corner.

As previously stated, the sinuous or winding passage of sealing slot 24 is generally defined by sidewalls 32 and 34 and end wall 36. Because of the parallel, complementary nature of sidewalls 32 and 34, only one of the sidewalls will be described in great detail; thus, the following description of sidewall 32 applies equally to sidewall 34. Sidewall 32 generally extends in an axial direction from an open end of the slot to end wall 36, and includes axial sections 62, 62', a tooth 42 and a recess 82. Axial section 62 extends from the end of pipe 14 to recess 82 and is preferably in alignment with axial section 62' which extends from tooth 42 to end wall 36. Stated differently, if axial section 62 were to continuously extend from the pipe end, through recess 82 and tooth 42, to end wall 36 it would preferably superimpose axial section 62'. According to a preferred embodiment, axial section 62 has a length in the range of 1-5 mm, inclusive, and axial section 62' has a length in the range of 4-12 mm, inclusive. It is, of course, possible to shift one or more of the axial sections 62, 62' (see axial section 62 in phantom) such that the two sections are parallel to one another but are angularly offset resulting in a non-superimposed alignment.

Tooth 42 protrudes from sidewall 32 towards recess 84 which is formed in the opposing sidewall 34 in a generally complementary fashion, and includes an outboard edge 46 facing the open end of the slot, a free edge 48, and a slanted inboard edge 50 generally facing end wall 36. Outboard edge 46 extends circumferentially which, as shown in the drawings is in a direction that is substantially perpendicularly to the axis of pipe lap joint 10, and this outboard edge 46 defines an edge of both tooth 42 and recess 82. During collapsing of the sealing slot, this circumferential edge 46 of each tooth engages the corresponding edge of the other tooth to form a seal between the sidewalls of the sealing slot. According to other embodiments, outboard edge could extend along an angled or slanted direction, similar to slanted inboard edge 50, so long as it is designed to accommodate the corresponding features of sidewall 34 when sealing slot 24 is collapsed such that the seal is formed and maintained over a significant range of possible circumferential closure. Free edge 48 extends axially in substantial parallel alignment with axial sections 62, 62' and is connected to outboard edge 46 and slanted inboard edge 50 via radiused corners. Inboard edge 50 preferably extends obliquely at an obtuse angle from a junction with free edge 48 to a junction with axial section 62', but could be provided such that it extends in a direction generally perpendicular to the axis of the pipe lap joint (much the same as outboard edge 46). According to a preferred embodiment, outboard edge 46 has a length in the range of 4-8 mm, inclusive, free edge 48 has a length in the range of 2-4 mm, inclusive, and inboard edge 50 has a length in the range of 2-5 mm, inclusive, and extends at an angle $\theta$ generally in the range of 25°-45°, inclusive. The dimensions of the outboard edge 46 provided above are preferably measured from free edge 48 to an inner edge 58 of recess 82.

Recess 82 is retracted from sidewall 32 into the body of pipe 14 and has a generally complementary shape to the opposing tooth 44 so that the tooth may mate or nest within the recess when sealing slot 24 is collapsed. Like tooth 42, recess 82 also includes outboard edge 46 (shared with tooth 42), an inner edge 58 and a slanted inboard edge 60. Again, due to the similarity and complementary nature of these sections of recess 82 and the corresponding sections of tooth 42 bearing the same names, a duplicate explanation of these sections has been omitted. According to a preferred embodiment, recess 82 generally complements tooth 44 in both size and shape and therefore includes an inner edge 58 with a length in the range of 2-4 mm, inclusive, and inboard edge 60 has a length in the range of 2-5 mm, inclusive, and extends at an angle ψ in the range of 25°-45°, inclusive. It should be recognized, however, that sidewall 32 is provided for illustrative purposes only and that the particular length, angle, configuration, etc. of each of its sections may differ from the specific embodiment shown here.

As will be appreciated, the design of sealing slot 24 provides it with a gap having a uniform width X along most of its axial length. This enables the slot to undergo greater circumferential closure than the prior art slot shown in U.S. Pat. No. 6,089,624. In particular, whereas the teeth of the prior art slot would engage the opposite sidewall of the slot and limit further reduction in the end diameter of pipe 14, slot 24 of the present application, with its expanded width at both of the teeth, enables the pipe end diameter to be further reduced by a significant amount as the slot is further closed by tightening of the clamp towards that shown in FIG. 7. This increases the robustness of pipe lap joint 10 since it can accommodate a greater variation in pipe diameters. According to a preferred embodiment, the width X is in the range of 4-10 mm, inclusive.

Sealing slot 24 is shaped to provide teeth 42, 44 and recesses 82, 84 in a configuration which has no angular corners formed by straight lines meeting at a point; instead, each change of direction of the sidewalls 32 and 34 is curvilinear or radiused to form the teeth and recesses. Such corners are referred to herein as "rounded" corners. Preferably, each rounded corner is defined by a radius of about one-half millimeter or greater, but may be defined by a plurality of radii. The use of rounded corners between axial section 62' and tooth 42, between tooth 42 and recess 82, and between recess 82 and axial section 62, instead of angular corners, is effective to reduce the wear of the punch and die tooling so that a significant increase in the number of operating cycles is realized.

The oval-shaped end wall 36 of sealing slot 24 facilitates the collapse of the sealing zone 18 under the force exerted by band clamp 16, and is preferably aligned in a perpendicular direction to that of slot 24 and the axis of pipe lap joint 10. The clearance provided by the end wall 36 allows the slot to close together uniformly along its length and thereby provides improved sealing.

Because of manufacturing tolerances on the sizes of the pipes 12 and 14, the clearance between two randomly selected pipes when the end of one is inserted into the end of the other will vary between a theoretical minimum and maximum. The amount of collapsing of the outer pipe by tightening the clamp 16 will thus vary from joint-to-joint. The dimensions of the slot 24 are such that with pipes 12 and 14 having the tightest allowable fit within manufacturing tolerances, the radial contraction of the outside pipe 14 by tightening clamp 16 will be sufficient to close the slot by engagement of the teeth 42, 44 with recesses 84, 82, respectively. It has been discovered that under normal production conditions, if the pipes can be manually telescoped together there will be a sufficient collapse of the outer pipe to displace the teeth 42 and 44 into engagement so that there will be no significant leakage. This occurs because a pair of pipes having the tightest allowable fit within the specified manufacturing tolerances cannot, as a practical matter, be telescoped together due to such factors as out-of-roundness or other irregularities in the shape or surfaces of the pipes. Thus, the sealing slot 24 will provide a good fluid seal between such pipes provided that the two pipes can be telescoped together by hand. In the case of pipes 12 and 14 having the loosest allowable fit within manufacturing tolerances, sliding engagement of the teeth 42, 44 with recesses 84, 82, respectively, during radial contraction of pipe 14 will be allowed by the slot dimensions until the clamp 16 is fully tightened so that the outside pipe 14 is in tight engagement with the inside pipe 12. Thus the sealing slot 24 will provide a good fluid seal between two pipes having the loosest allowable fit.

Figure 8:
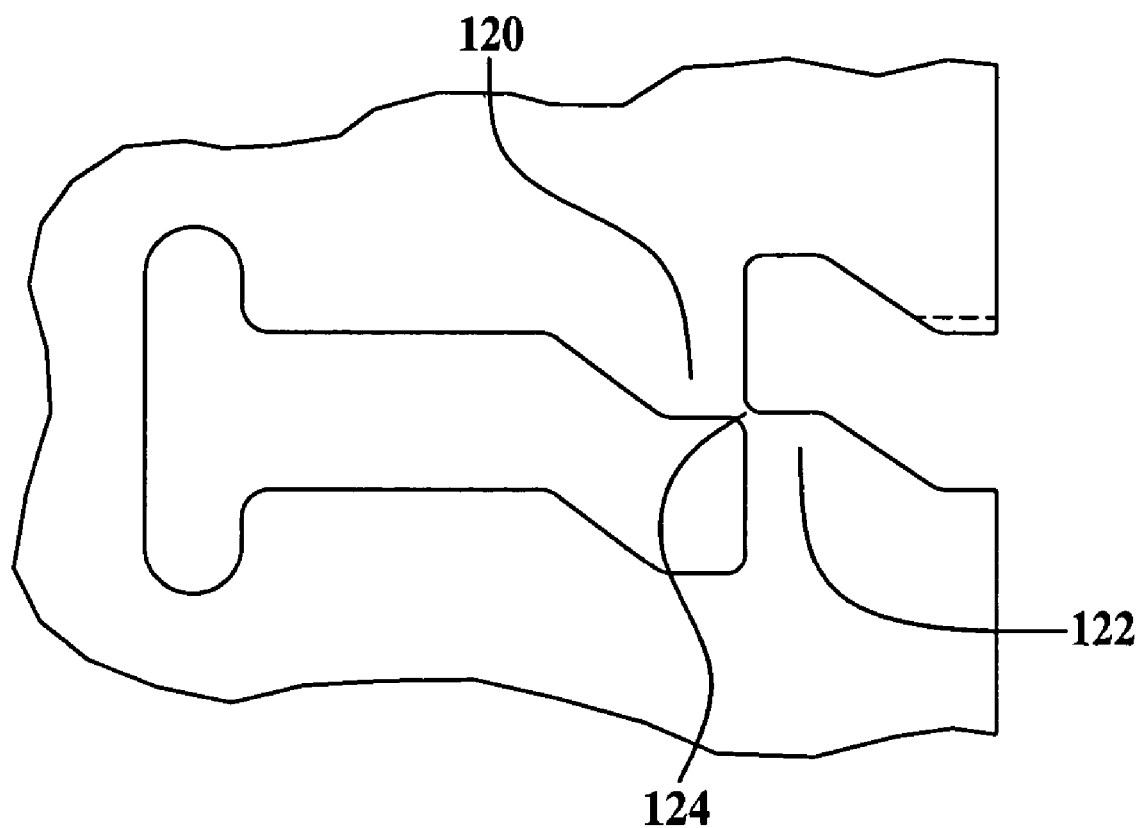
FIG. 8 is an enlarged view of another embodiment of a sealing slot shown in a non-collapsed position.

With reference to FIG. 8, another embodiment of the sealing slot is shown where the corners of teeth 120, 122 are joined by a frangible bridge 124 formed as a unitary portion of the pipe end. The bridge 124 is designed to break or separate during collapse of the sealing slot. Should tightening of band clamp 16 result in less slot collapse or restriction than is typically desired, metal bridge 124 would remain intact and provide a certain amount of sealing strength and thus avoid or at least mitigate a potential fluid leak. U.S. Pat. No. 5,588,680 provides additional detail concerning the frangible bridge 124, and is hereby incorporated by reference.

A preferred band clamp 16 will be described in conjunction with FIGS. 1-4, although other band clamps or coupling devices could be used as well. Band clamp 16 comprises a clamping band 72 which is disposed around the outer pipe 14 over the sealing zone 22. The clamping band 72, for sealing purposes, should cover the inboard end of the slot 24 and cover the juncture of teeth 42, 44 with recesses 84, 82, respectively. The clamping band 72 is provided with a tightening means 74. The clamping band 72 is, for the most part, circular or roundish in cross-section. It has a roundish sector 76 adapted to fit around the sealing zone 22 on the pipe 14 and a channel-shaped sector 78 which comprises a pair of sidewalls 80 and 90 extending radially outwardly from the roundish sector. The clamping band 72 is made of a single piece of sheet metal and each free end thereof is folded back on itself to form a double layer. Thus, the sidewalls 80 and 90 are of double thickness and terminate at their outer ends in respective loops or bights 86 and 88. The bights 86 and 88 serve as retaining members for holding the sidewalls in place when the tightening means 74 is tightened, as will be described subsequently.

The clamping band 72 is tightened around the pipe 14 by the tightening means 74. The tightening means comprises a reaction member or spline 92 which is disposed within the channel-shaped sector 78 and which is adapted to seat upon the outer surface of the sealing zone 22 of pipe 14. For this purpose, the spline has an inner surface of arcuate configuration conforming to the pipe 14. The spline 92 is provided with a pair of oppositely facing concave surfaces 94 and 96. The tightening means includes a bolt 98 and a nut 102. It also includes a spacer 104 disposed outside the sidewall 82 and having a convex surface which is opposite the concave surface 94 of the spline 92. The bolt 98 has a head 100 with a convex surface which is disposed outside the sidewall 84 opposite the concave surface 96 on the spline 92. The bolt extends through holes in the sidewalls 94 and 96, the spline 92 and the spacer 104.

Figure 4:
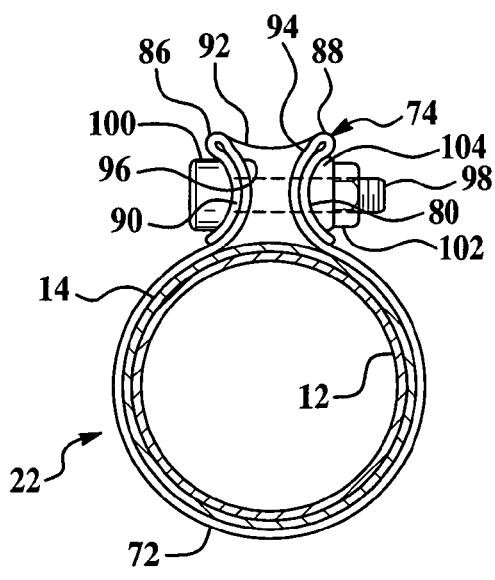
FIG. 4 is a view of the pipe lap joint of FIG. 2 taken on lines 4-4.

When the pipe joint 10 is assembled and the nut 102 is tightened on the bolt 98, the relationship of the parts is as shown in FIGS. 2, 4 and 7. It will be understood that, before the nut and bolt are tightened, the sidewalls 82 and 84 of the channel-shaped sector 78 are not seated against the spline 92. When the nut 102 is tightened, the bolt head 101 and the spacer 104 are drawn together and press the sidewalls 82 and 84 into seating engagement with the spline 92. As a result of this tightening action, the roundish sector 76 is stretched around the sealing zone 22 of the pipe 14 in tight engagement therewith. This tightening action of the clamp 16 exerts sufficient force on the sealing zone 22 to collapse the sealing zone and thereby move the teeth 42 and 44 into engagement with recesses 84, 82, respectively, to seal the slot 24.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe lap joint, comprising:
an inside pipe having a pipe end;
an outside pipe having a pipe end with a sealing zone extending over at least a portion of said inside pipe end and including a collapsible sealing slot;
said sealing slot having a first sidewall with a first tooth and recess, a second sidewall with a second tooth and recess, and an end wall, wherein said first and second sidewalls are generally parallel to one another and are arranged such that said first tooth opposes said second recess in a generally complementary fashion, and said second tooth opposes said first recess in a generally complementary fashion; and
a band clamp extending over at least a portion of said sealing zone, wherein tightening of said band clamp causes said sealing slot to collapse such that said first tooth is received by said second recess and said second tooth is received by said first recess.

2. The pipe lap joint of claim 1, wherein at least one of said first and second sidewalls further includes first and second axial sections extending in a direction generally parallel to the axis of said pipe lap joint.

3. The pipe lap joint of claim 2, wherein said at least one sidewall includes rounded corners between said first axial section and said tooth, between said tooth and said recess, and between said recess and said second axial section.

4. The pipe lap joint of claim 1, wherein at least one of said first and second teeth includes an outboard edge generally facing an open end of said sealing slot, a free edge generally facing the opposing sidewall, and an inboard edge generally facing said end wall.

5. The pipe lap joint of claim 4, wherein said outboard edge extends in a direction generally perpendicular to the axis of said pipe lap joint, said free edge extends in a direction generally parallel to said axis, and said inboard edge extends in a direction generally slanted with respect to said axis.

6. The pipe lap joint of claim 5, wherein said outboard edge has a length in the range of 4-8 mm, inclusive, said free edge has a length in the range of 2-4 mm, inclusive, and said inboard edge has a length in the range of 2-5 mm, inclusive, and extends at an angle θ generally in the range of 25°-45°, inclusive.

7. The pipe lap joint of claim 1, wherein said end wall is generally oval-shaped and extends in a direction generally perpendicular to the axis of said pipe lap joint.

8. The pipe lap joint of claim 1, wherein said first and second sidewalls are separated by a gap having a generally uniform width X along most of its axial length.

9. The pipe lap joint of claim 8, wherein said width X is in the range of 4-10 mm, inclusive.

10. The pipe lap joint of claim 1, wherein said first and second teeth are joined by a frangible bridge that breaks during collapse of said sealing slot.

11. The pipe lap joint of claim 1, wherein said sealing slot is the only sealing slot located on said outside pipe end.

12. The pipe lap joint of claim 1, wherein said band clamp comprises a clamping band surrounding at least a portion of said sealing zone and a tightening mechanism for drawing said band clamp tight, said tightening mechanism includes a spline positioned between sidewalls of said clamping band, and a nut and bolt with said bolt extending through said sidewalls and said spline.

13. A pipe lap joint, comprising:
an inside pipe having a pipe end;
an outside pipe having a pipe end with a sealing zone extending over at least a portion of said inside pipe end and including a collapsible sealing slot;
said sealing slot having a first sidewall with a first tooth and recess, a second sidewall with a second tooth and recess, and an end wall, wherein said first and second sidewalls are generally parallel to one another and are arranged such that said first tooth opposes said second recess in a generally complementary fashion, and said second tooth opposes said first recess in a generally complementary fashion, and wherein at least one of said first and second recesses includes an outboard edge generally facing an open end of said sealing slot, an inner edge generally facing the opposing sidewall, and an inboard edge generally facing said end wall; and
a band clamp extending over at least a portion of said sealing zone, wherein tightening of said band clamp causes said sealing slot to collapse such that said first tooth is received by said second recess and said second tooth is received by said first recess.

14. The pipe lap joint of claim 13, wherein said outboard edge extends in a direction generally perpendicular to the axis of said pipe lap joint, said inner edge extends in a direction generally parallel to said axis, and said inboard edge extends in a direction generally slanted with respect to said axis.

15. The pipe lap joint of claim 14, wherein said outboard edge has a length in the range of 4-8 mm, inclusive, said inner edge has a length in the range of 2-4 mm, inclusive, and said inboard edge has a length in the range of 2-5 mm, inclusive, and extends at an angle ψ generally in the range of 25°-45°, inclusive.

16. A pipe for use in conjunction with a second pipe and a pipe clamp to form a pipe lap joint, comprising:
 a section of pipe having a diametrically-enlarged pipe end and a collapsible sealing slot extending axially into said pipe end from an end surface of said pipe section;
 said sealing slot having first and second sidewalls that are circumferentially separated by a gap, said sidewalls each defining a tooth and a recess with the tooth of the first sidewall being axially aligned with the recess of the second sidewall, and the recess of the first sidewall being axially aligned with the tooth of the second sidewall such that when said sealing slot is collapsed by a radially-inward force on said pipe end, said tooth of each sidewall fits into the recess of the other sidewall; and
 wherein said teeth each have a circumferentially-extending edge that engages the edge of the other tooth during collapsing of said sealing slot, whereby said edges form a seal between said sidewalls while said teeth and said recesses enable said sealing slot to undergo a significant amount of circumferential closure.

17. A pipe as set forth in claim 16, wherein said sealing slot extends from said end surface of said pipe section to an end wall, and wherein the width X of said gap in the circumferential direction is uniform along the length of said sealing slot.

18. A pipe as set forth in claim 16, wherein said teeth are connected by a frangible bridge.

19. A method for telescopically coupling the ends of an inside and an outside pipe together, comprising the steps:
 (a) providing an inside pipe end;
 (b) providing an outside pipe end having a sealing zone with a collapsible sealing slot, said sealing slot includes a first sidewall with a first tooth and recess, a second sidewall with a second tooth and recess, and an end wall, wherein said first and second sidewalls are generally parallel to one another and are arranged such that said first tooth opposes said second recess in a generally complementary fashion, and said second tooth opposes said first recess in a generally complementary fashion;
 (c) providing a band clamp having a clamping band and a tightening mechanism;
 (d) placing said band clamp around said outside pipe end and over said sealing zone;
 (e) inserting said inside pipe end within said outside pipe end so that said sealing zone extends over at least a portion of said inside pipe end; and
 (f) forcing said first tooth into said second recess and said second tooth into said first recess by tightening said tightening mechanism so that said clamping band applies a radially inward force to at least a portion of said sealing zone.

* * * * *